Figure 1:
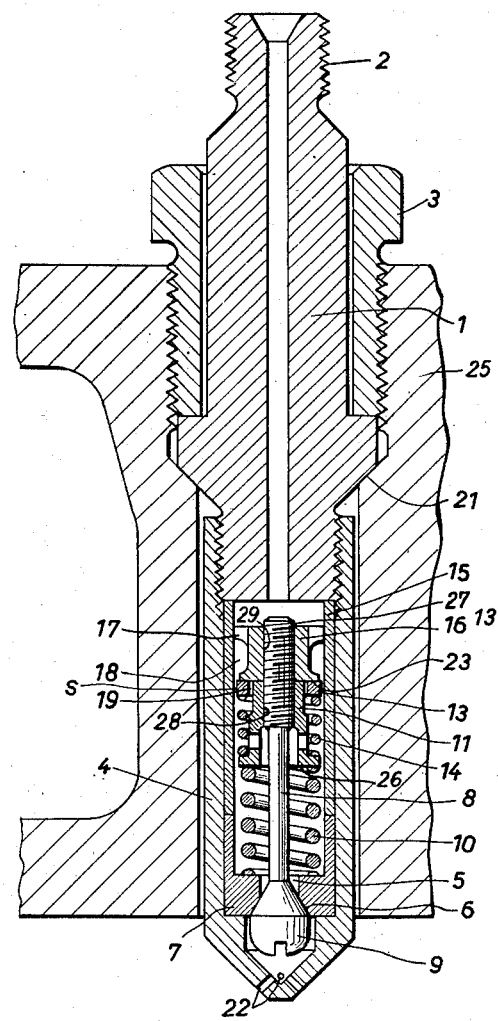

Aug. 25, 1959    H. BEK    2,901,181
INJECTION NOZZLE INCLUDING DOUBLE CHECK VALVE
Filed July 3, 1957

INVENTOR:
HEINRICH BEK

2,901,181

INJECTION NOZZLE INCLUDING DOUBLE CHECK VALVE

Heinrich Bek, Arbon, Switzerland, assignor to Adolph Saurer Ltd., Arbon, Switzerland Application July 3, 1957, Serial No. 669,882

Claims priority, application Switzerland May 25, 1957

4 Claims. (Cl. 239—101)

This invention relates to fuel injection, and more particularly to injection nozzles of the kind including a jet needle opening in the direction of flow of the fuel, and wherein the end of this needle facing the flow of fuel, mounts a spring collar serving as an abutment for the closing spring.

It is a primary object of the present invention to provide an injection nozzle the performance of which enhances the quietness of running of the engine.

Other objects, and the manner in which the same are attained, will become apparent as the specification proceeds.

The invention contemplates providing an injection nozzle of the kind including a jet needle opening in the direction of flow of the fuel, and wherein the end of the needle facing the fuel flow mounts a spring collar serving as an abutment for the closing spring, with an annular valve seat on the spring collar, and an annular disk valve likewise opening in the direction of flow of the fuel, and forced against the annular valve seat by an additional spring; the center opening of the disk valve forms, together with a port of reduced diameter of the spring collar, a ring slot effective as a by-pass, and the disk valve is guided on its circumference, with some play, in the bore of the valve sleeve. This arrangement results in that the jet needle, at the start of the delivery stroke, begins to oscillate and to inject small quantities of fuel, to open entirely only in the further course of the injection procedure, under the influence of gradually increasing opening forces.

Advantageously, the spring collar comprises a nut and a check nut which are screwed on the shaft of the jet needle, the nut being provided in the form of a spring collar serving as an abutment for the additional spring acting on the disk valve, as well as for the closing spring.

In this manner, the several components of the injection nozzle according to the invention combine in exposing in the course of the injection procedure, the valve needle to gradually increase opening forces, with the result that the needle oscillates outwardly with a gradually increasing amplitude. In consequence, the small quantities of fuel injected during the initial oscillations of the needle, progressively increase per degree of injection angle, thus resulting in an injection rhythm or curve which enhances the quietness of running of the engine.

In the drawing accompanying this specification and forming part thereof, two embodiments of the invention are shown diagrammatically by way of example.

Figure 2:
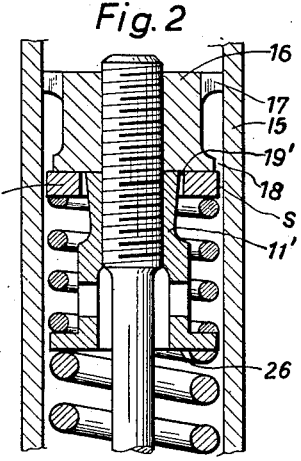

In the drawing:

Fig. 1 is a longitudinal section through an injection nozzle according to the invention, and Fig. 2 shows a detail of Fig. 1, drawn to a larger scale and modified with respect to the by-pass provided between the spring collar and the disk valve.

Referring now to the drawing, wherein like elements are denoted by identical reference numerals, and first to Fig. 1, the feed conduit for the fuel is shown at 1. The fuel supply line (not shown in the drawing) may be connected on the feed conduit by means of the screw thread 2. The feed conduit 1 is forced on its seat 21 provided on the cylinder head 25 of the engine, by means of a pressing nipple 3. A screw cap 4 which, at the bottom, is provided with the injection orifices 22, secures the seat portion 7 and the sleeve 15 on the feed conduit portion 1. The valve needle 9 has its seat 6 on the seat portion 7. The shaft 8 of the needle 9 extends through the feed bore 5 in the seat body 7 and is surrounded by the closing spring 10, one end of which abuts against the seat body 7 while the other end thereof acts on the nut 11 which, in its bottom portion 26, is provided in the form of a spring collar. The upper part of the shaft 8 is provided with the thread 27. The nut 11 is screwed by means of its thread 28, on the shaft 8 of the valve needle 9. A check nut 16 screwed on the shaft 8 by means of the thread 29 is guided in the guide sleeve 15 by means of lugs 17. The bottom of the check nut 16 forms a valve seat 23, the valve disk 13 being forced against this seat 23 by the spring 14. The annular valve disk 13 which surrounds the nut 11, but is spaced therefrom by the ring slot 19, is guided in the guide sleeve 15 with some play, as indicated at $s$. The fuel fed through the bore of the feed conduit body 1 passes on to the disk valve 13 by way of the narrow ring slot 18 formed between check nut 16 and guide sleeve 15.

According to Fig. 1, the mutually opposed surfaces of the nut 11 and the disk valve 13 are cylindrical. According to Fig. 2, however, the outer surfaces of the nut 11' which is surrounded by the disk valve 13, is conical in the region of the ring slot 19'. Whereas in the arrangement according to Fig. 1, the ring slot 19 remains equal in size when the stroke of the disk valve 13 increases, the arrangement according to Fig. 2 results in the size of the ring slot 19' increasing corresponding to increases in the stroke of the disk valve 13.

The fuel injection nozzles according to the invention, operate as follows:

At the start of the delivery stroke, the pressure prevailing in the sleeve 15 above as well as, because of the slot $s$, below the disk valve 13, rises until it reaches the injection pressure controlled by the spring 10, whereupon the valve needle 9 opens and starts to oscillate while injecting through the orifices 22, an initial stage during which the fuel passes from the space above the valve disk 13 into the space below the valve disk 13, through the narrow slot $s$. As long as the disk valve 13 remains on its seat at the bottom of the nut 11, only a small quantity of fuel is fed through the narrow slot $s$, with the result that for the first degrees of the injection angle, only very little fuel is injected through the orifices 22. In view of the continuous supply of fuel, however, the fuel banks up on the disk valve 13 until the disk valve 13, overcoming the force of the additional spring 14, escapes downwardly so the fuel can pass through the ring slot 19 between the nut 11 and the disk valve 13, as a result of which increasing opening forces act on the valve needle 9.

The invention proceeds from the observation that any check valve capable of operating in the absence of friction, oscillates under the influence of the hydraulic forces acting at its seat, over the entire injection angle, with the result that intermittent injections occur. The several elements of the invention described and shown herein are designed to subject the valve needle 9, in the course of the injection step, to gradually increasing axial opening forces so the valve needle will oscillate outwardly with correspondingly increased amplitudes. The banked up fuel is permitted, in consequence, to escape through the gradually increased opening section at the seat 6. The entire oscillatory outward motion can be controlled by the bias of the spring 14. If this bias is small, the valve needle 9 is bound to oscillate over the entire injection angle; if the bias is very material, the section at the seat 6 is immediately ripped open. It is always possible to obtain an optimum oscillatory condition somewhere between the two above noted extremes. Of course, with any given bias of the spring 14, the valve needle 9 oscillates outwardly more rapidly at a higher rate of revolutions, than at a small rate of revolutions. An advantageous compromise which is satisfactory for the entire speed range of the engine, is obtained if, as illustrated in Fig. 2, the sectional area of the by-pass 19' is rendered as small as possible at the start of the stroke of the disk valve 13, and is designed to increase gradually when the said stroke increases.

I wish it to be understood that I do not desire to be limited to the details of construction, design and operation shown and described, as numerous variations falling within the scope of the following claims and involving no departure from the spirit of the invention nor any sacrifice of the advantages thereof, may occur to persons skilled in the art.

I claim:

1. A fuel injection nozzle comprising in combination, a casing, seat and sleeve portions forming part of said casing, a valve-like jet needle adapted to open in the direction of flow of the fuel, extending inside said sleeve portion and having a seat portion normally engaging said seat portion on the casing, a closing spring surrounding said valve needle, the surface of the seat portion on the casing, facing the interior of said sleeve portion serving as one abutment for said closing spring, a nut assembly mounted on the upper part of said valve needle, said nut assembly including a bottom portion in the form of a spring collar serving as the other abutment for said closing spring, and a nut assembly top portion guided in said casing and having a bottom formed as a disk valve seat, said nut assembly including a portion of reduced diameter, an annular disk valve adapted to open in the direction of flow of the fuel, surrounding said reduced diameter portion with a clearance, said clearance defining a ring slot effective as a by-pass for the fuel, said disk valve being guided, with some play, in said casing, and an additional spring abutting against said spring collar portion and disposed to force said disk valve against said disk valve seat, whereby the jet needle begins to oscillate at the start of the delivery stroke and to inject small quantities of fuel, to open entirely only in the further course of the injection procedure under the influence of growing opening forces.

2. An injection nozzle according to claim 1, wherein the nut assembly comprises a nut and a check nut, both mounted on the jet needle, said nut being provided as a spring collar for the closing spring as well as the additional spring.

3. An injection nozzle according to claim 1, wherein the portion of reduced diameter of the nut assembly which is surrounded by the annular disk valve, in the region covered by the stroke of the disk valve, is provided cylindrical whereby the by-pass section remains constant for the entire stroke of the disk valve.

4. An injection nozzle according to claim 1, wherein the portion of reduced diameter of the nut assembly which is surrounded by the annular disk valve, in the region covered by the stroke of the disk valve, tapers in the direction of flow of the fuel, whereby the by-pass section has a minimum area in the closed position of the disk valve, said area increasing as the stroke of the disk valve increases.

References Cited in the file of this patent

UNITED STATES PATENTS

| 2,452,283 | Ball | Oct. 26, 1948 |
| 2,812,979 | Ziesche et al. | Nov. 12, 1957 |

OTHER REFERENCES

| 866,597 | France | May 26, 1941 |
| 1,032,162 | France | Mar. 25, 1953 |